US012603881B2

(12) United States Patent　　(10) Patent No.:　US 12,603,881 B2
Li et al.　　(45) Date of Patent:　Apr. 14, 2026

(54) CLOUD SERVICE ACCESS PERMISSION SETTING METHOD FOR ENCLAVE INSTANCE AND CLOUD MANAGEMENT PLATFORM

(71) Applicant: Huawei Cloud Computing Technologies Co., Ltd., Guizhou (CN)

(72) Inventors: Jun Li, Beijing (CN); Zhixi Sun, Gui'an (CN); Qi Zhang, Hangzhou (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 54 days.

(21) Appl. No.: 18/814,811

(22) Filed: Aug. 26, 2024

(65) Prior Publication Data

US 2024/0422153 A1　　Dec. 19, 2024

Related U.S. Application Data

(63) Continuation of application No. PCT/CN2023/077968, filed on Feb. 23, 2023.

(30) Foreign Application Priority Data

Feb. 25, 2022　(CN) .......................... 202210176632.8
May 30, 2022　(CN) .......................... 202210605661.1

(51) Int. Cl.
*H04L 9/40*　　(2022.01)
(52) U.S. Cl.
CPC ............ *H04L 63/083* (2013.01); *H04L 63/10* (2013.01)

(58) Field of Classification Search
CPC ..... H04L 63/102; H04L 63/10; H04L 63/108; H04L 63/20; H04L 63/08; H04L 9/088; H04L 63/105; H04L 63/0815; H04L 63/0876; H04L 63/062; H04L 9/0897; H04L 9/0631; G06F 21/107; G06F 21/31; G06F 21/445; G06F 21/577; G06F 21/602; G06F 21/64; G06F 11/3006; G06F 21/62
See application file for complete search history.

(56) References Cited

U.S. PATENT DOCUMENTS

2017/0329957 A1* 11/2017 Vepa ...................... G06F 21/445
2017/0353456 A1* 12/2017 Coronel ................ H04W 12/08
2019/0098055 A1　 3/2019 Pitre et al.
(Continued)

OTHER PUBLICATIONS

Huang Chenlin et al, "Toward security as a service: A trusted cloud service architecture with policy customization," Journal of Parallel and Distributed Computing, Nov. 26, 2020, XP086441035, total 13 pages.

*Primary Examiner* — Hitesh Patel
(74) *Attorney, Agent, or Firm* — Conley Rose, P.C.

(57) ABSTRACT

A cloud management platform provides an identity and access management (IAM) service and a security token service (STS). The IAM service is used to confirm an enclave instance type input or selected by a first tenant and a conversion rule input or selected by the first tenant. The conversion rule is used to convert, into a tenant-customized attribute, an enclave instance attestation document provided by an enclave instance corresponding to the enclave instance type. The STS is used to receive a token obtaining request sent by an application program in the enclave instance.

17 Claims, 5 Drawing Sheets

(56) References Cited

U.S. PATENT DOCUMENTS

| | | | |
|---|---|---|---|
| 2019/0098056 A1* | 3/2019 | Pitre | G06F 21/6218 |
| 2020/0314171 A1* | 10/2020 | Featonby | G06F 9/45558 |
| 2023/0246813 A1* | 8/2023 | Tsirkin | H04L 9/0631 |
| | | | 713/168 |

* cited by examiner

CLOUD SERVICE ACCESS PERMISSION SETTING METHOD FOR ENCLAVE INSTANCE AND CLOUD MANAGEMENT PLATFORM

CROSS-REFERENCE TO RELATED APPLICATIONS

This is a continuation of International Patent Application No. PCT/CN2023/077968 filed on Feb. 23, 2023, which claims priority to Chinese Patent Application No. 202210176632.8 filed on Feb. 25, 2022 and Chinese Patent Application No. 202210605661.1 filed on May 30, 2022. All of the aforementioned patent applications are hereby incorporated by reference in their entireties.

TECHNICAL FIELD

This application relates to the field of cloud technologies, and in particular, to a cloud service access permission setting method for an enclave instance and a cloud management platform.

BACKGROUND

A cloud technology is a hosting technology that integrates hardware, software, a network, and other resources in a wide area network or local area network to implement data computing, storage, processing, and sharing. With the development of cloud computing, more tenants migrate services to the cloud. This poses higher requirements for cloud resource access and security.

An attribute-based access control (ABAC) model is a policy-based access control manner commonly used in the industry. Access permission is granted to a user by using a policy that combines attributes, to implement an accurate access control decision.

However, the ABAC model depends on collection, transfer, and use of attribute information, and how to securely and effectively collect, transfer, and use various types of attribute information is still an important problem that needs to be resolved urgently.

SUMMARY

Embodiments of this application provide a cloud service access permission setting method for an enclave instance and a cloud management platform. This helps securely and effectively collect, transfer, and use various types of attribute information, to ensure that different types of tenants implement centralized and secure access management on a cloud resource.

According to a first aspect, an embodiment of this application provides a cloud service access permission setting method for an enclave instance. The method may be performed by a cloud service system. The cloud service system may include a cloud management platform, a target cloud service, and an application program in an enclave instance. The cloud management platform may be a cloud server, and the application program in the enclave instance may be deployed on user equipment.

The method may include: A cloud management platform provides an identity and access management (IAM) service. The IAM service is used to confirm an enclave instance type input or selected by a first tenant and a conversion rule input or selected by the first tenant. The conversion rule is used to convert, into a tenant-customized attribute, an enclave instance attestation document provided by an enclave instance corresponding to the enclave instance type. The cloud management platform provides a security token service (STS). The STS is used to receive a token obtaining request sent by an application program in the enclave instance. The token obtaining request carries the enclave instance attestation document. The STS is further used to: convert the attestation document into the tenant-customized attribute according to the conversion rule, and return, to the application program, a token carrying the tenant-customized attribute. The token indicates that the application program in the enclave instance has permission to access a target cloud service.

According to the foregoing method, the cloud management platform supports the first tenant in customizing security management service configuration information. The security management service configuration information includes the enclave instance type input or selected by the first tenant and the conversion rule input or selected by the first tenant, and is used to describe a security management requirement of the first tenant for at least one cloud service subscribed by the first tenant. In this way, the STS can issue, based on the received token obtaining request, the token associated with the security management requirement of the first tenant to the application program in the enclave instance, to ensure that different types of tenants implement centralized and secure access management on a cloud resource.

With reference to the first aspect, in a possible implementation, the IAM service is further used to confirm an authorization policy input or selected by the first tenant or a second tenant. The STS converts the attestation document into the tenant-customized attribute according to the conversion rule when the authorization policy is met, and returns, to the application program, the token carrying the tenant-customized attribute. Optionally, a role of the first tenant is a security administrator, and a role of the second tenant is a permission administrator.

According to the foregoing method, the IAM service and the STS may centrally issue, to the application program in the enclave instance based on the attestation document when the authorization policy is met, the personalized token for accessing the target cloud service, to implement centralized and secure access management of different types of tenants on the cloud resource. It should be understood that, in this embodiment of this application, the first tenant and the second tenant are tenant roles used to implement different management functions, and are not limited to different users. In actual application, the first tenant and the second tenant may be different roles of a same tenant, or may be different roles of different tenants. Details are not described herein again.

With reference to the first aspect, in a possible implementation, the authorization policy includes allowing the application program to access the target cloud service in the enclave instance corresponding to the enclave instance type.

With reference to the first aspect, in a possible implementation, the method may further include: The application program in the enclave instance obtains the enclave instance attestation document from a trusted computing base (TCB) before sending the token obtaining request.

With reference to the first aspect, in a possible implementation, the method may further include: The application program in the enclave instance sends a service invocation request to the target cloud service. The service invocation request carries the token. The target cloud service receives the service invocation request, confirms validity of the token with the STS, and allows the application program to access the target cloud service on a premise that the STS confirms that the token is valid.

With reference to the first aspect, in a possible implementation, the attestation document includes at least one platform configuration register (PCR) measurement value.

According to a second aspect, an embodiment of this application provides a cloud service system, including a cloud management platform and a target cloud service. The cloud management platform provides an IAM service. The IAM service is used to confirm an enclave instance type input or selected by a first tenant and a conversion rule input or selected by the first tenant. The conversion rule is used to convert, into a tenant-customized attribute, an enclave instance attestation document provided by an enclave instance corresponding to the enclave instance type. The cloud management platform provides an STS. The STS is used to receive a token obtaining request sent by an application program in the enclave instance. The token obtaining request carries the enclave instance attestation document. The STS is further used to: convert the attestation document into the tenant-customized attribute according to the conversion rule, and return, to the application program, a token carrying the tenant-customized attribute. The token indicates that the application program in the enclave instance has permission to access the target cloud service.

With reference to the second aspect, in a possible implementation, the IAM service is further used to confirm an authorization policy input or selected by the first tenant or a second tenant. The STS converts the attestation document into the tenant-customized attribute according to the conversion rule when the authorization policy is met, and returns, to the application program, the token carrying the tenant-customized attribute.

With reference to the second aspect, in a possible implementation, a role of the first tenant is a security administrator, and a role of the second tenant is a permission administrator.

With reference to the second aspect, in a possible implementation, the authorization policy includes allowing the application program to access the target cloud service in the enclave instance corresponding to the enclave instance type.

With reference to the second aspect, in a possible implementation, the application program in the enclave instance obtains the enclave instance attestation document from a TCB before sending the token obtaining request.

With reference to the second aspect, in a possible implementation, the application program in the enclave instance sends a service invocation request to the target cloud service. The service invocation request carries the token. The target cloud service receives the service invocation request, confirms validity of the token with the STS, and allows the application program to access the target cloud service on a premise that the STS confirms that the token is valid.

With reference to the second aspect, in a possible implementation, the attestation document includes at least one PCR measurement value.

According to a third aspect, an embodiment of this application provides a cloud management platform. The cloud management platform includes a first service providing module, configured to provide an IAM service. The IAM service is used to confirm an enclave instance type input or selected by a first tenant and a conversion rule input or selected by the first tenant. The conversion rule is used to convert, into a tenant-customized attribute, an enclave instance attestation document provided by an enclave instance corresponding to the enclave instance type. The cloud management platform includes a second service providing module, configured to provide an STS. The STS is used to receive a token obtaining request sent by an application program in the enclave instance. The token obtaining request carries the enclave instance attestation document. The STS is further used to: convert the attestation document into the tenant-customized attribute according to the conversion rule, and return, to the application program, a token carrying the tenant-customized attribute. The token indicates that the application program in the enclave instance has permission to access a target cloud service.

With reference to the third aspect, in a possible implementation, the IAM service is further used to confirm an authorization policy input or selected by the first tenant or a second tenant. The STS converts the attestation document into the tenant-customized attribute according to the conversion rule when the authorization policy is met, and returns, to the application program, the token carrying the tenant-customized attribute.

With reference to the third aspect, in a possible implementation, a role of the first tenant is a security administrator, and a role of the second tenant is a permission administrator.

With reference to the third aspect, in a possible implementation, the authorization policy includes allowing the application program to access the target cloud service in the enclave instance corresponding to the enclave instance type.

According to a fourth aspect, an embodiment of this application provides a cloud management platform, including a processor and a memory. The memory stores program instructions, and the processor executes the program instructions to perform any method performed by the cloud management platform in the first aspect.

According to a fifth aspect, an embodiment of this application provides a computer-readable storage medium. The computer-readable storage medium is configured to store a computer program. When the computer program is run on a computing apparatus, the computing apparatus is enabled to perform the method according to the first aspect and any possible implementation of the first aspect.

In embodiments of this application, based on the implementations provided in the foregoing aspects, the implementations may be further combined to provide more implementations.

For technical effects that can be achieved in any possible implementation of any one of the second aspect to the fifth aspect, refer to descriptions of technical effects that can be achieved in any possible implementation of the first aspect. No repeated description is provided.

DESCRIPTION OF EMBODIMENTS

Figure 1:
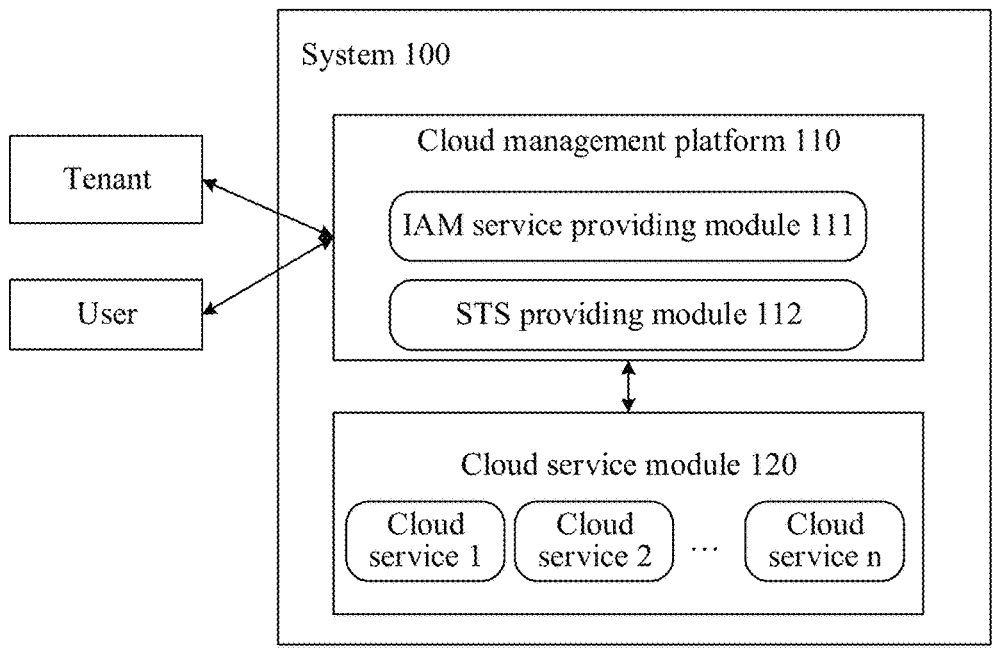
FIG. 1 is a schematic diagram of an architecture of a cloud service system to which an embodiment of this application is applicable.

The following explains and describes some terms in embodiments of this application, to facilitate understanding of a person skilled in the art.

1. Cloud Service

The cloud service refers to an internet-based service that is provided in a form of a representational state transfer application programming interface (REST API) and that meets a requirement of an enterprise internet technology (IT), for example, elastic computing, a virtual network, data storage, and a database.

In embodiments of this application, a cloud service provider may be referred to as a cloud vendor for short.

2. Cloud Resource

The cloud resource is short for a cloud computing resource provided by a cloud management platform for a tenant, is an integration of resources related to cloud computing, and includes cloud services and cloud instances.

For example, the cloud services may include but are not limited to a private network cloud (VPC) providing service, a gateway providing service, a firewall service, a NAT service, a cloud disk, an elastic Internet Protocol (IP) address (EIP), a cloud monitoring service, and other cloud services provided by a cloud vendor. For example, the cloud instances may include but are not limited to a virtual machine, a container, or a bare metal server. The virtual machine, the container, or the bare metal server is a virtual instance provided by the cloud vendor in a data center of the cloud vendor for the tenant to use. For example, the cloud instances may include an enclave instance.

3. Tenant

The tenant is an owner of a cloud resource, and has management permission on the cloud resource.

The tenant may subscribe to or rent the cloud resource from a cloud vendor based on a service requirement in a payment manner. The management permission of the tenant on the purchased cloud resource may include but is not limited to security management permission and access control permission. The tenant may be divided into a first tenant and a second tenant by roles based on different management functions implemented by the tenant. For example, the first tenant may be configured to implement the security management permission on the purchased cloud resource, and the second tenant may be configured to implement the access control permission on the purchased resource.

In embodiments of this application, the management permission of the tenant on the cloud resource may be implemented via an electronic device (including a physical device and/or a virtual apparatus) of the tenant. In some embodiments, the electronic device of the tenant may be referred to as a tenant node. The first tenant and the second tenant may be different roles of a same tenant, or may be some roles of different tenants. This is not limited in embodiments of this application.

4. User

The user is an operator of a cloud resource, and can operate the cloud resource only after being authorized by an owner of the cloud resource.

In embodiments of this application, an operation performed by the user on the cloud resource may be implemented via an electronic device (including a physical device and/or a virtual apparatus) of the user. In some embodiments, the electronic device of the user may be referred to as a user node.

In embodiments of this application, the user may include an application program in an enclave instance.

5. IAM Service

The IAM service is a web service, may help a tenant securely control access to a resource and control a user (for example, an application program in an enclave instance) to perform identity verification (log in) and authorization (have permission) to use the resource, and has functions such as single sign-on, powerful authentication management, policy-based centralized authorization and audit, dynamic authorization, and enterprise manageability.

In a cloud service scenario in embodiments of this application, the tenant may perform access control management on the user by using an IAM service, and grant different permission to different users for different cloud resources.

6. STS

The STS is a temporary access permission management service, and is used to obtain a temporary access credential, namely, a security token (STS Token) that can be used to customize a validity period and access permission.

In a cloud service scenario in embodiments of this application, when purchasing a cloud resource from a cloud vendor, a tenant may register with the cloud vendor, to obtain an entity identity of the tenant (tenant identity) and an access credential (for example, including an identity key and a login password). The tenant can create an identity (user identity) and a credential (for example, an identity key) for a user, and authorize the user. After obtaining the credential and after authorization, the user can obtain the STS token from the STS based on the access credential of the user, and then use the STS token to access the cloud resource purchased by the tenant, for example, a target cloud service.

7. ABAC

The attribute-based access control is an access control method that allows or denies, based on an assigned attribute of a subject, an assigned attribute of an object, an environment condition, and a set of policies related to these attributes and conditions, operations requested by the subject on the object.

The attribute is a feature of the subject, the object, or the environment condition. Attribute information may be defined in a form of a name-value pair.

The subject is a person or a non-practicing entity (NPE) (for example, a device that initiates an access request to the object). One or more attributes may be assigned to the subject.

An ABAC model manages a system resource of an access mechanism of the ABAC model, for example, a device, a file, a record, a table, a process, a program, a network, or a domain that includes or receives information. The object may be any object that can be operated by the subject by initiating a request, including data, an application program, a service, a device, a network, and the like.

The operations are functions that may need to be performed in response to the request of the subject for the object, and may include but are not limited to reading, writing, editing, deleting, copying, executing, and modifying.

The policy is an expression of a rule or relationship. The policy enables a cloud management platform to determine, based on attribute values of the given subject, object, and possible environment condition, whether to allow the access requested by the subject.

The environment condition is an environment context or a situation context where the access request is located. The environment condition is a detectable environment feature, is independent of the subject or the object, and may include current time, a day of a week, a user location, a current threat level, a security level, or the like.

It should be noted that, in embodiments of this application, the ABAC is a logical access control method. An objective of logical access control is to protect an object (regardless of data, a service, an application program, a network device, or an IT resource of another type) from being affected by unauthorized operations. These operations may include discovering, reading, creating, editing, deleting, and executing the object. Protected objects are owned by an individual or organization (for example, the tenant in embodiments of this application), and have a specific intrinsic value, to encourage these owners to protect the protected objects. As the owner of the object, the tenant has the responsibility to establish a policy, to describe which operations can be performed on the object, who can perform the operations, and in which context can the subject perform the operations. If the subject meets an access control policy established by the object owner, the subject is authorized to perform an operation on the object, in other words, access permission on the object is granted to the subject. If the subject does not meet the policy, the access to the object is denied.

8. Trusted Execution Environment (TEE)

The trusted execution environment is a hardware-enhanced execution environment isolation mechanism (for example, an ARM Trust Zone), and is a security zone that is isolated from other modules of a system-on-a-chip and can execute a trusted application (TA). The trusted execution environment ensures that sensitive data is stored, processed, and protected in an isolated and trusted environment, and provides authorization software that is isolated and that is securely executed, to implement end-to-end security.

The TEE may define a feature of an execution environment by measuring hardware, firmware, system software, an application program, and the like, and may provide an attestation document of the feature of the execution environment.

9. Trusted Computing Base (TCB)

The TCB is a collection of all security protection mechanisms for implementing computer system security protection. The mechanisms may appear in a form of hardware, firmware, and software. Once a program error or security risk occurs in a component of the TCB, a damaging effect on security of an entire system is caused. On the contrary, if a problem occurs in other parts other than the TCB of the system, only related permission granted by a system security policy to the other parts is disclosed. The permission is generally low, and the damaging effect on the security of the system is small.

In embodiments of this application, the TCB may include a security module and a public key infrastructure (PKI). The security module may provide information related to service security for a user node, for example, trusted hardware information, trusted software information, and trusted firmware information. The security module further provides boot measurement on an execution environment of the user node, and provides an attestation document of the execution environment. The PKI is an infrastructure of the security module, and may issue a digital certificate to the security module. The PKI provides a trust root certificate. The STS uses a root certificate of the PKI to verify validity of the attestation document provided by the security module.

10. Enclave

In hardware security extension, the enclave is a trusted execution environment that is provided by Intel SGX, that is of hardware security, and that is referred to as enclave. The enclave may provide strong assurance of confidentiality and integrity for a user program, to protect security of user outsourcing data with the minimum trust for a cloud vendor.

11. Service Providing Module

The service providing module is a functional module that is of a cloud management platform and that is configured to implement management services, and helps a tenant securely control access control management of a user on a cloud resource. The management services may include but are not limited to the foregoing IAM service and STS. Some services may be used together. For example, the IAM service provides long-term permission configuration (authorization without a validity period) for the user, and the STS may issue, based on a single service session of the user, a security access token having a short validity period and on-demand permission reduction, to provide more precise access control management.

In embodiments of this application, the management services may further include a security management service. The security management service may be provided by a security management service providing module of the cloud management platform, and supports a tenant node in providing, for the cloud management platform based on an application scenario requirement, a service requirement, and the like of the tenant node, security management service configuration information customized by the tenant (including an enclave instance type input or selected by the tenant and a conversion rule input or selected by a first tenant). In this way, the cloud management platform can centrally and securely implement access control management on a cloud service purchased by the tenant.

In application, in a possible implementation, the security management service providing module may be an independent service providing module of the cloud management platform. The security management service providing module may have a trust relationship with another service providing module (for example, an IAM service providing module and/or an STS providing module) of the cloud management platform, so that the another service providing module can implement centralized and secure access control management on the cloud resource with reference to the security management service configuration information customized by the tenant. In another possible implementation, the security management service providing module may be a submodule of a service providing module (for example, an IAM service providing module or an STS providing module) of the cloud management platform, so that the service providing module can implement centralized and secure access control management on the cloud resource with reference to the security management service configuration information customized by the tenant. A deployment manner or a product form of the security management service providing module is not limited in embodiments of this application.

12. Request Parameters (Request Params)

The request parameters are a series of parameters sent by a tenant or an application program to a cloud management platform or a cloud service module (the cloud management platform or the cloud service module is configured to provide at least one type of cloud service for the tenant or the application program), and are used to request to perform management configuration or implement an access operation on a cloud resource purchased by a tenant node.

In embodiments of this application, the tenant or the application program may separately transfer corresponding request parameters to the cloud management platform or the cloud service module by invoking an application programing interface (application programing interface, API) provided by the cloud management platform or the cloud service module. The request parameters may be organized or constructed based on a format specified in a communication protocol supported by the cloud management platform or the cloud service module. For example, the request parameters may be carried in an API request packet, and the API request packet may include an API request header (request header) and an API request body (request body). The API request header may be used to carry parameters indicating the communication protocol, a request method (for example, a SET method, a GET method, or a DELETE method), a signature of the API request body, and the like. The API request body is used to carry parameters such as an identity of an API requester and an attribute document of a user node. Specific content and an organization manner of the request parameters are not limited in embodiments of this application.

The at least one in embodiments of this application includes one or more, and a plurality of means more than or equal to two. In addition, in descriptions of this application, terms such as "first" and "second" are merely used to distinguish between described objects, and cannot be understood as an indication or implication of relative importance or an indication or implication of an order.

The following describes this application in detail with reference to the accompanying drawings and embodiments.

FIG. 1 is a schematic diagram of an architecture of a cloud service system to which an embodiment of this application is applicable.

As shown in FIG. 1, the cloud service system 100 may include a cloud management platform 110 and a cloud service module 120 that are provided by a cloud vendor.

The cloud management platform 110 may be externally connected, via an internet, to an electronic device operated by a tenant (for example, a permission administrator) or an electronic device operated by a user (for example, operation and maintenance personnel or an application program). The cloud management platform 110 may be connected to the cloud service module 120 in the system 100 via an internal network. The tenant may register an account on the cloud management platform 110, and the account is qualified to purchase (including different payment forms, for example, subscribing or renting) a cloud resource. After the cloud resource is successfully purchased, the cloud management platform 110 may indicate the cloud service module 120 to create the cloud resource, and provide a proper access manner for the tenant and a user (for example, another tenant) authorized by the tenant. In this way, the tenant can remotely manage the cloud resource, and control the user to remotely access or use the cloud resource, to provide at least one cloud service for the tenant and the user. The cloud services provided for the tenant and the user are represented as a cloud service 1, a cloud service 2, . . . , and a cloud service n, where n is an integer greater than or equal to 1.

For example, the cloud resource is a virtual machine, and the tenant may select, on the cloud management platform, a specification (for example, a memory, a processor, and a disk) of the virtual machine. After the tenant pays successfully, the cloud management platform 110 indicates the cloud service module 120 to create a virtual machine having the specification. The tenant may configure access permission on the virtual machine (for example, logging in to the virtual machine, and a stopping operation and a deleting operation performed on the virtual machine) for the user. After the configuration succeeds, the user may perform a corresponding authorized operation on the virtual machine. The tenant may alternatively grant permission to purchase or create the virtual machine to the user. It should be understood that in this embodiment of this application, the cloud resource may alternatively be, for example, various cloud services such as a container, a bare metal server, and an EIP. A type of the cloud service is not limited in this embodiment of this application.

The cloud management platform 110 may include at least one service providing module. The at least one service providing module may be configured to provide a corresponding service for the tenant and the user, to help the tenant securely implement access control management on the purchased cloud resource. Different access permission is granted to different users for different cloud resources, and the user is controlled to perform identity verification and authorization, so that the user can securely access or use the cloud resource.

For example, the at least one service providing module may include an IAM service providing module 111 and an STS providing module 112. The IAM service providing module 111 provides, for the tenant and the user, the IAM service described above, and the STS providing module 112 provides, for the tenant and the user, the STS service described above.

Currently, in some cloud technology-based service providing solutions, the tenant uses the IAM service and the STS service described above to configure an access control policy of an application program and implement access control management of the user for the cloud resource. The solution may include method steps shown in FIG. 2.

S21: A tenant sets an authorization policy, namely, an access control policy, for a user by using an IAM service provided by an IAM service providing module 111 on a cloud management platform 110 side.

S22: After the setting is completed, the IAM service providing module 111 feeds back an authorization response result to the tenant.

If the setting succeeds, the authorized user may use corresponding permission and perform an access operation on a cloud resource purchased by the tenant. If the setting fails, the user is not authorized, and cannot perform an access operation on a cloud resource purchased by the tenant.

S23: After being authorized, the user may obtain a correct access credential (for example, an access key). In this case, the user may send a request parameter to an STS providing module 112 on the cloud management platform 110 side based on the obtained access credential. The request parameter may include the access credential of the user. The request parameter is used to request to obtain an STS token. The STS token is used by the user to perform the access operation on the cloud resource purchased by the tenant.

S24: After receiving the request parameter from an application program, the STS providing module 112 issues a target STS token to the user based on a trust relationship with the IAM service providing module 111 after identity and permission verification based on the access credential from the user succeeds.

based on the target STS token from the application program succeeds, and feeds back an access response to the application program.

To more precisely control secure access of the application program to the cloud resource, in some designs, the cloud management platform 110 further enables the ABAC model described above in the IAM service providing module 111, to configure the authorization policy for the user.

Figure 2:
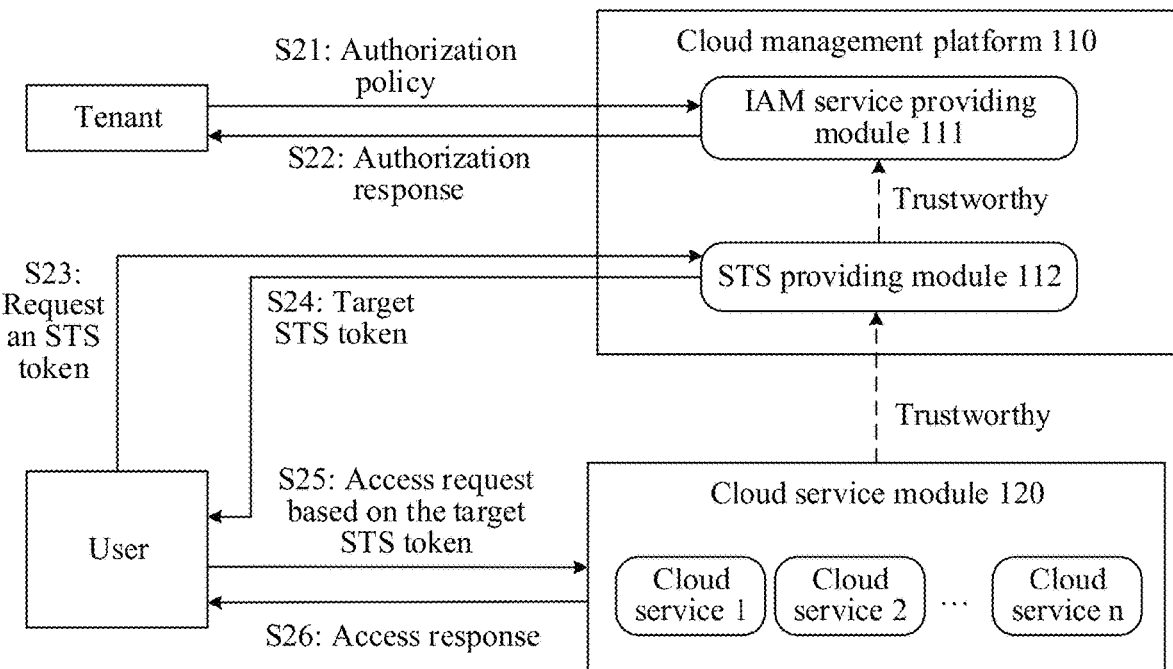
FIG. 2 is a schematic diagram of some cloud technology-based service providing solutions.

In these designs, in S21 shown in FIG. 2, the tenant may adapt to a use requirement for the ABAC model, and set the authorization policy based on a user attribute, a resource attribute, a request parameter attribute, and the like. In S25 shown in FIG. 2, when the user initiates the access request for the cloud resource, the target cloud service on the cloud service module 120 side performs an attribute-based access control check based on the request parameter carried in the access request from the user, and provides the target cloud service for the user after the check is passed.

For example, when the ABAC model is enabled, the cloud management platform 110 may provide an API, so that the tenant can configure, through the API provided by the cloud management platform 110, related attribute information needed by the ABAC model. A format of an authorization document used to implement the configuration is shown as follows:

```
{
    "Effect": //a related permission result attribute, for example, allow
"Allow" or deny "Deny",
        "Principal": //a related subject identifier, for example, a user name "alice",
        "Action": [//an operation identifier of at least one operation related to a
specified resource, for example, decrypting (Decrypting) a key management service (key
management service, KMS) resource or generating a data key (GenerateDataKey)],
        "Resource": //a related resource identifier, used to specify a specific
resource, where at least one resource name, resource identifier, or the like may be input,
        "Condition": {//a related access control condition attribute, may be input in
a string (String) and may be used for access condition control, including but not limited to:
attributes related to the subject identifier, for example, a position, a title, a qualification, a service
label, and a status; resource attributes, for example, a resource label and a resource storage
domain;
attributes related to a user request, for example, a source IP address (Source IP), a source VPC
address, and a communication protocol (for example, https and http); and attributes related to an
execution environment of a user node, for example, a hardware identifier, trusted measurement
values (for example, a PCR) of firmware and software, and a digital signature certificate digest
value of the firmware or software,
        }
}
```

S25: The user initiates an access request to a cloud service module 120 based on the target STS token obtained from the STS providing module 112, to request to access a target cloud service, for example, a cloud service 1.

S26: The target cloud service on a cloud service module 120 side performs a corresponding access processing operation based on a trust relationship with the STS providing module 112 after user identity and permission verification For example, authorization semantically means: "allowing a user "Zhang San" to perform a specified KMS operation only after initiating a request via a specified secure execution environment with a trust level of 2, where the secure execution environment with the trust level of 2 is defined as a trusted software measurement value PCR0 and a trusted digital signature certificate digest value PCR8 that are known in advance", and the authorization document may be shown as follows:

```
{
    "Effect": "Allow",
    "Principal": "Zhang San",
    "Action": [
        "kms:Decrypt",
        "kms:GenerateDataKey",
        "kms:GenerateRandom"
    ],
    "Resource": "*",
    "Condition": {
        "StringEquals": {
            "g:Attestation:PCR0":
"0xaef0def2abcdef3abcdef4abcdef5abcdef6abcdef7abcdef8abcdef9abcdef8abcdef7abcdef6abcde
f5abcdef4abcdef3abcdef2abcdef1abcdef0a1ef2",
            "g:Attestation:PCR8":
"0x1af2def2abcdef3abcdef4abcdef5abcdef6abcdef7abcdef8abcdef9abcdef8abcdef7abcdef6abcde
f5abcdef4abcdef3abcdef2abcdef1abcdef0abcde"
        }
    }
}
```

In the foregoing service providing solution that enables the IAM service, STS service, and ABAC model, the more control dimension attributes supported by the authorization policy, the higher security of access control. Although this may help implement secure access control in a more precise manner to some extent on the cloud resource purchased by the tenant, this solution design requires high professional level of tenant authorization management. For example, this solution design requires that an authorization administrator can understand a precise semantic meaning and a correct value of each access control attribute. This is extremely difficult in practice because a common authorization administrator does not understand a trusted measurement method of the user and measurement of the trusted measurement value. In the authorization policy, storing the measurement value is extremely likely to cause an error, and it is difficult to find the error. Consequently, great management costs are caused. A new design challenge that comes with this is how each cloud service securely and effectively collects and transfers various attributes to ensure that different types of tenants implement centralized and secure access management on the cloud resource. This also causes great technical design and reconstruction costs for each cloud service.

For the foregoing problem, embodiments of this application provide a cloud service access permission setting method for an enclave instance and a cloud management platform, to help securely and effectively collect, transfer, and use various types of attribute information, to ensure that different types of tenant nodes implement centralized and secure access management on a cloud resource and meet management requirements of the different types of tenants for the cloud resource and use requirements of different users for the cloud resource.

For ease of understanding, based on the system architecture shown in FIG. 1, the following describes the cloud service system, the cloud management platform, and an implementation principle of the cloud service access permission setting method for the enclave instance in embodiments of this application.

Figure 3:
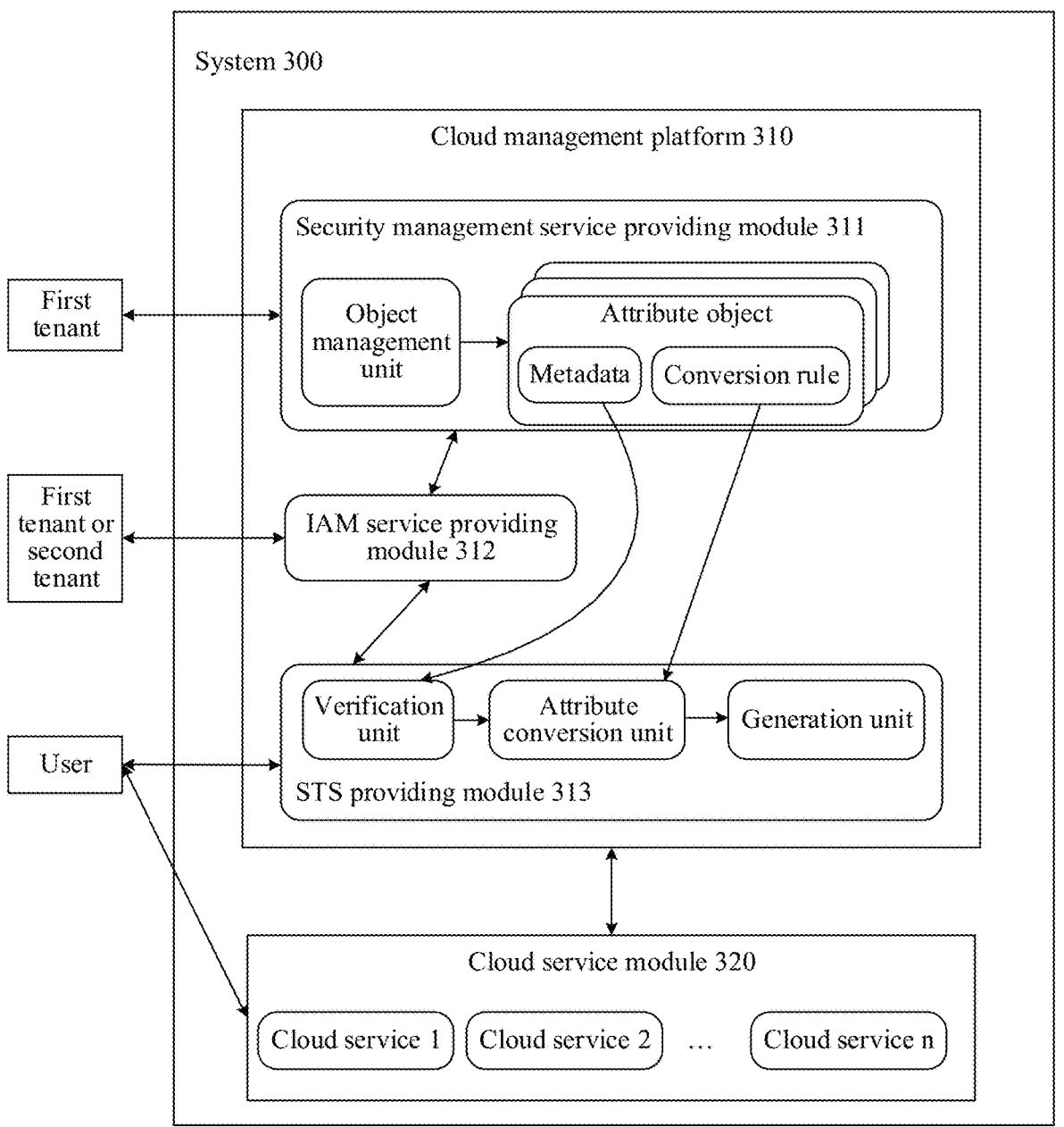
FIG. 3 is a schematic diagram of an architecture of a cloud service system according to an embodiment of this application.

As shown in FIG. 3, the cloud service system 300 to which an embodiment of this application is applicable may include the cloud management platform 310 and a cloud service module 320.

Similar to FIG. 1, the cloud management platform 310 may be externally connected to an electronic device of a tenant or a user via an internet. The cloud management platform 310 may be connected to the cloud service module 320 in the system 300 via an internal network. The tenant may register an account on the cloud management platform 310 to purchase (including different payment forms, for example, subscribing or renting) a cloud resource. After the resource is successfully purchased, the cloud management platform 310 may indicate the cloud service module 320 to create the cloud resource, and provide a proper access manner for the tenant and a user authorized by a tenant node. In this way, the tenant can remotely manage the cloud resource, and control the user to remotely access or use the cloud resource, to provide cloud services corresponding to the cloud resource for the user. For example, the cloud services may be represented as a cloud service 1, a cloud service 2, . . . , and a cloud service n, where n is an integer greater than or equal to 1. The cloud resource may be various cloud services such as a container, a bare metal server, and an EIP. A type of the cloud service is not limited in this embodiment of this application.

The cloud management platform 310 may include at least one service providing module, for example, including but not limited to a security management service providing module 311, an IAM service providing module 312, and an STS providing module 313. Optionally, any one of the at least one service providing module may further include a sub-functional unit. For example, the security management service providing module 311 may include an object management unit, and the STS providing module 313 includes a verification unit, an attribute conversion unit, and a generation unit. The at least one service providing module and the sub-functional unit of the at least one service providing module that are of the cloud management platform 310 may help collect and transfer various types of attribute information, to ensure that different types of tenants implement centralized and secure access management on cloud resources purchased by the tenants, and meet management requirements of the different types of tenants for the cloud resource and use requirements of different users for the cloud resource, to implement the method in embodiments of this application.

It may be understood that FIG. 3 merely shows an example of functional modules that may be included in the system 300, and does not limit a quantity and a function of each functional module. For example, the system 300 may include a plurality of types of cloud service modules, and any cloud service module may also include a respective cloud service submodule, to provide different types of cloud services for the different types of tenants. The service providing module of the cloud management platform 310 in this embodiment of this application is not limited to the service providing module shown in FIG. 3, and the sub-functional unit of the service providing module is not limited either. Details are not described herein again.

The following uses an example in which a cloud instance is an enclave instance to describe, with reference to the accompanying drawings and embodiments, the system 300 shown in FIG. 3 and functions of the functional module included in the system 300 and the sub-functional unit of the functional module.

1. Security Management Service Providing Module 311:

The security management service providing module 311 is configured to provide a security management service for the tenant, the user, and the cloud resource purchased by the tenant, including but not limited to implementing, based on security management service configuration information, functions such as creating (creating), describing (describing), updating (updating), or deleting (deleting) the security management service. In this way, the security management service providing module 311 may support a tenant-customized attribute, and help securely and effectively collect, transfer, and use a related attribute customized by the tenant to implement the security management service.

As shown in FIG. 3, the security management service providing module 311 may include the object management unit. The object management unit may receive the security management service configuration information input or selected by a first tenant (for example, a security administrator). The security management service configuration information may include, for example, metadata used to describe an attribute object and a conversion rule. The object management unit may create at least one attribute object based on the security management service configuration information. Each attribute object may include metadata (metadata) and a conversion rule (rule) that are of at least one attribute, the metadata is used to describe a type and an operation method of the at least one attribute, and the conversion rule is a conversion rule of the at least one attribute. Based on trust relationships with the security management service providing module 311, the IAM service providing module 312 and the STS providing module 313 may use the metadata and the conversion rule that are of the at least one attribute object of the security management service providing module 311 to centrally and securely implement access control management on the cloud resource purchased by the tenant.

During configuration, in an example, the cloud management platform 310 may provide a security management service configuration API for the first tenant, where the security management service configuration API indicates a plurality of fields that indicate different attribute objects of the security management service configuration information. The first tenant may input a corresponding parameter for each field on an electronic device of the first tenant. The cloud management platform 310 may receive the security management service configuration information sent by the electronic device of the first tenant, where the security management service configuration information may include the plurality of fields and the parameter input by the tenant node for each field. In another example, the cloud management platform 310 may provide a console interface for the electronic device of the first tenant, and the console interface may provide a plurality of attribute configuration items. The first tenant may input or select corresponding parameters in the plurality of attribute configuration items on the console interface. The cloud management platform 310 may determine the security management service configuration information input or selected by the first tenant on the console interface, where the security management service configuration information includes the plurality of attribute configuration items provided by the console interface and the parameter input or selected by the first tenant for each attribute configuration item. An implementation of the configuration process is not limited in this embodiment of this application.

After the first tenant configures a function of the security management service providing module 311 on the cloud management platform 310, the security management service providing module 311 may store the obtained security management service configuration information. The object management unit may create the at least one attribute object based on attribute object description information in the stored security management service configuration information, to implement access control management on the purchased cloud resource.

In an example in which the cloud management platform 310 provides the API to configure the function of the security management service providing module 311, a document format used to implement the security management service configuration may include a metadata field and a conversion rule field, for example, as shown in the following:

```
{
    Metadata: //metadata describing an attribute related to an attribute
object, may be input or selected in a form of a key-value pair, including but not limited to a
timestamp (timestamp), a digest (digest), a hardware ID, a security version number of firmware
and software, a measurement value (PCR) of firmware and software code, a code signature
certificate (Certificate, cert for short), and other application data (user data) related to a user service.
    Rules: //a conversion rule related to the attribute object, where one
or more conversion rules may be included; and an attribute conversion function converts, into a
group of output attribute sets according to a corresponding attribute conversion rule, a group of
input attribute sets that meet a condition.
}
```

The cloud management platform 310 may display the foregoing document format on a web page provided by the internet, and indicate a usage of a corresponding field, for example, the related prompt after the foregoing//. After viewing the foregoing document format, the tenant fills in corresponding parameters based on the document format. For example, the tenant fills in the following information after "Metadata:" (only one example is provided herein):

```
{
    security_version_number: uint  .size 8                                         ; a
security version number of an execution environment
    timestamp: uint  .size 8,                                                      ;
creation time of an attestation document
    digest: text,                                                                  ;
a hash algorithm for computing the PCR measurement value when the execution environment is
started
    pcrs: [* text]                                                          ; a PCR
measurement value list, where a plurality of PCR values are supported
    certificate: text,                                                             ;
a signature certificate of the attestation document
    cabundle: [* text],                                                     ; a CA
certificate chain of the signature certificate of the attestation document
    public_key: text,                                                       ; user
public key data
    user_data: text,                                                               ;
user service data
    nonce: text,                                                                   ;
a one-time random number nonce
}
```

This indicates a metadata format of an attribute object, where the metadata format may include a plurality of attribute names and attribute values and indicate a value type of the attribute value. Herein, "uint .size 8" indicates an unsigned integer type and contains 8 bytes, "text" indicates a text type, [* text] indicates a list that includes one or more text values, and ";" indicates a semantic explanation of a specified type.

Further, the first tenant may fill in one or more conversion rules after "Rules":. A method for describing the conversion rule is: (a condition expression that the input attribute set needs to meet)=>(the output attribute set). An implementation example of the Rules is as follows:

```
"Rules": {
    ([key=="security_version_number",
value>=10])=>([key="DeviceUpdated", value="OK"]);
    ([key=="pcrs[0]",
value=="0xaef0def2abcdef3abcdef4abcdef5abcdef6abcdef7abcdef8abcdef9abcdef8abcdef7abcd
ef6abcdef5abcdef4abcdef3abcdef2abcdef1abcdef0a1ef2"] &&
    [key=="pcrs[8]",
value=="0x1af2def2abcdef3abcdef4abcdef5abcdef6abcdef7abcdef8abcdef9abcdef8abcdef7abcd
ef6abcdef5abcdef4abcdef3abcdef2abcdef1abcdef0abcde"])
    =>([key="DeviceTrustLevel", value="2"])
}
```

The conversion rule may exist in a form of a key-value pair and be described in a machine language. Different conversion rules are separated by the semicolon ";". In each attribute conversion rule, "=>" indicates outputting, a key-value pair before "=>" indicates a condition that needs to be met by an input attribute set and a value that are specified by the conversion rule, and a key-value pair after "=>" indicates an output attribute set and a value that are specified by the conversion rule. The symbol "&&" indicates "and" or logical operators such as "and" and "and". The specified output attribute set is output only when the input attribute set and the value of the input attribute set meet the specified condition.

For example, in "[key=="security_version_number", value>=10]", key=="security_version_number" indicates that a key of an input attribute is security_version_number, and value>=10 indicates that a value condition of key security_version_number of the input attribute is greater than or equal to 10. If related attribute information to be verified meets key== "security_version_number" and value>=10, the condition specified by the corresponding conversion rule is met. After attribute conversion, the output attribute set [key="DeviceUpdated", value="OK"] can be obtained.

Similarly, in [key=="pcrs[0]", value=="0xaef . . . a1ef2"] && [key=="pcrs[8]", value=="0x1af2 . . . abcde"], key =="pcrs[0]" and key=="pcrs[8]" indicate the keys of the input attributes, and value=="0xaef . . . alef2" and value==0x1af2 . . . abcde each indicate a corresponding value condition of the input attribute. If attribute information to be verified meets both key=="pcrs[0]", value== "0xaef . . . a1ef2" and key=="pcrs[8]", value== "0x1af2 . . . abcde", the condition specified by the corresponding conversion rule is met. After the attribute conversion, the output attribute set [key="DeviceTrustLevel", value="2"] is obtained. This output attribute set includes only one output attribute key DeviceTrustLevel, and a value of the attribute key is 2.

It should be understood that the foregoing description grammar of the conversion rule is merely an example, and another embodiment is not limited to also use this rule description method. In the another embodiment, these conversion rules may be described by using a completely different grammar or symbol language. Details are not described herein again.

The first tenant may send, to the cloud management platform 310 via the internet in a template manner, the plurality of fields in which parameters are input and the corresponding input parameters. The cloud management platform 310 detects parameters corresponding to different fields in a configuration document, to obtain corresponding requirements of the first tenant for the different fields. Therefore, in this embodiment of this application, the security management service configuration information may include a security management service configuration field and a parameter input by the first tenant. Further, the cloud management platform 310 may store the security management service configuration information from the first tenant in a memory associated with the security management service providing module 311. The object management unit in the security management service providing module 311 may use the stored security management service configuration information to manage an attribute object, for example, create an attribute object, and provide an attribute object-based security management service.

In this embodiment of this application, a to-be-created attribute object may be in one-to-one correspondence with an attribute object instance type, and the attribute object instance type may be provided by a cloud vendor and the cloud management platform 310. Based on the attribute object instance type supported by the cloud management platform 310, the security management service configuration information input or selected by the first tenant on the cloud management platform 310 may indicate at least one attribute object. The object management unit may create the at least one attribute object based on the attribute object description information in the security management service configuration information, and each attribute object may include metadata used to describe at least one attribute of the attribute object and an attribute conversion rule.

The metadata related to each attribute object may define in detail an instance type and a value range that are customized by the first tenant and that are used to implement security management. The conversion rule related to each attribute object may be used to specify a computing rule for the attribute conversion, to determine, through computing or logic judgment based on an assignment attribute of an instance corresponding to the instance type, an assignment attribute of the cloud resource, an environment condition, and a group of policies (for example, an authorization policy) related to these attributes and conditions, to allow or deny an operation requested by the user for the cloud resource. Another service providing module of the cloud management platform 310 other than the security management service providing module 311 may implement a corresponding service based on a trust relationship with the security management service providing module 311 and the metadata and the attribute conversion rule of the at least one attribute object, to improve security. For example, the IAM service providing module 312 may use the metadata and the conversion rule (including a valid output attribute set) of the at least one attribute object, and use an attribute in the output attribute set of the at least one attribute object to help a second tenant more effectively implement access control management on the cloud resource. The STS providing module 313 may use the metadata and the attribute conversion rule (including the valid output attribute set) of the at least one attribute object, and use the attribute in the output attribute set of the attribute object to help the second tenant implement a token management service for the cloud resource.

It should be noted that, in this embodiment of this application, the metadata provided by the first tenant in the attribute object description information may be selected from metadata provided by an attribute object instance provider, or may be customized and input by the first tenant. The conversion rule provided by the first tenant in the attribute object description information may be selected from an attribute conversion rule provided by the attribute object instance provider, or may be customized and input by the first tenant. The metadata in the attribute object description information may be used to verify validity of related information from the user, for example, whether the related information has a sub-attribute specified by the configuration information, whether the related information is a type specified by the configuration information, and whether the related information meets a related condition specified by the configuration information. The conversion rule in the attribute object description information may be used to describe the specified input attribute set, the specified condition that may need to be met when the input attribute set is converted into the corresponding output attribute set, and the corresponding output attribute set. When the related information from the user is valid, the conversion rule in the attribute object description information may use related attributes from the user as the input attribute set of the conversion rule. When the attributes meet the condition specified by the conversion rule, the input attribute set may obtain the corresponding output attribute set according to the corresponding conversion rule. A format and content of the configuration information are not limited in this embodiment of this application. The IAM service providing module 312 and the STS providing module 313 may use the output attribute set to implement the corresponding service. A format, content, and the like of the output attribute set are not limited in this embodiment of this application.

It should be noted that, in this embodiment of this application, in a possible implementation, the security management service providing module 311 may be an independent service providing module of the cloud management platform 310. The security management service providing module 311 may have a trust relationship with the another service providing module (for example, the IAM service providing module 312 and/or the STS providing module 313) of the cloud management platform 310, so that the another service providing module can implement centralized and secure access control management on the cloud resource with reference to the security management service configuration information customized by the tenant. In another possible implementation, the security management service providing module 311 may be a submodule of a service providing module (for example, the IAM service providing module 312) of the cloud management platform 310, so that the service providing module can implement centralized and secure access control management on the cloud resource with reference to the security management service configuration information customized by the tenant. A deployment manner or a product form of the security management service providing module 311 is not limited in this embodiment of this application.

2. IAM Service Providing Module 312:

The IAM service providing module 312 may help the tenant securely control access to the cloud resource and control the user to perform identity verification (log in) and authorization (have permission) to use the cloud resource, and has functions such as single sign-on, powerful authentication management, policy-based centralized authorization and audit, dynamic authorization, and enterprise manageability.

Configurations implemented by the tenant on different service providing modules of the cloud management platform 310 may be interconnected. Similarly, the cloud management platform 310 may provide an IAM service configuration API or a console interface for the first tenant or the second tenant (for example, a permission administrator), and the first tenant or the second tenant may provide IAM service configuration information, for example, an authorization policy, for the IAM service providing module 312 through the API or the console interface provided by the cloud management platform 310. The IAM service providing module 312 may store the authorization policy from the first tenant or the second tenant. Further, the IAM service providing module 312 may use the metadata and the attribute conversion rule (including the valid output attribute set) of the at least one attribute object and the authorization policy to implement access control management on the user.

For example, the first tenant or the second tenant inputs or selects the authorization policy on the cloud management platform 310 through the API. The authorization policy may be configured by using an authorization document in the following format:

```
{
    "Effect": //a related permission result attribute, for example, allow
"Allow" or deny "Deny",
    "Principal": //a related subject identifier, for example, a user name
"alice",
    "Action": [//an operation identifier of at least one operation related
to a specified resource, for example, decrypting (Decrypting) a key management service (key
management service, KMS) resource or generating a data key (GenerateDataKey)],
    "Resource": //a related resource identifier, used to specify a specific
resource, where at least one resource name, resource identifier, or the like may be input,
    "Condition": {//a related access control condition attribute, may be
input in a string (String) and may be used for access condition control, including but not limited
to: attributes related to the subject identifier, for example, a position, a title, a qualification, a
service label, and a status; resource attributes, for example, a resource label and a resource storage
domain; attributes related to a user request, for example, a source IP address (Source IP), a source
VPC address, and a communication protocol (for example, https and http); and attributes related
to an execution environment of a user node, for example, a hardware identifier, trusted
measurement values (for example, a PCR value) of firmware and software, and a digital signature
certificate digest value of the firmware or software,
    }
}
```

For example, authorization semantically means: "allowing a user "Zhang San" to perform a specified KMS operation only after initiating a request via a specified secure execution environment with a trust level of 2", the authorization document may be shown as follows (the authorization document uses a DeviceTrustLevel attribute key, where the attribute key is an output attribute set in the foregoing conversion rule example):

```
{
    "Effect": "Allow",
    "Principal": "Zhang San",
    "Action": [
        "kms:Decrypt",
        "kms:GenerateDataKey",
        "kms:GenerateRandom"
    ],
    "Resource": "*",
    "Condition": {
        "StringEquals": {
            "DeviceTrustLevel=2"
        }
    }
}
```

The first tenant or the second tenant may send, to the cloud management platform 310 via the internet in a template manner, the plurality of fields in which parameters are input and the corresponding input parameters. The cloud management platform 310 detects parameters corresponding to different fields in the authorization document, to obtain corresponding requirements of the first tenant or the second tenant for the different fields. Therefore, in this embodiment of this application, the IAM service configuration information may include an IAM service configuration field, and a parameter input by the first tenant or the second tenant. Further, the cloud management platform 310 may store the IAM service configuration information from the first tenant or the second tenant in a memory associated with the IAM service providing module 312. The IAM service providing module 312 may use the stored IAM service configuration information to help the first tenant or the second tenant centrally and securely perform access control management on the cloud resource.

It should be noted that, in actual application, if the security management service providing module 311 is a submodule of a service providing module (for example, the IAM service providing module 312) of the cloud management platform 310, correspondingly, function extension may be performed on the IAM service providing module 312, or a functional component of the IAM service providing module 312 may be extended, to enable the IAM service providing module 312 obtained after the function extension to implement a function implemented by the security management service providing module 311. For details, refer to related descriptions of the security management service providing module 311. Details are not described herein again.

3. STS Providing Module 313:

The STS providing module 313 is configured to provide, for the user, a temporary access credential, namely, a security token (STS Token) used to customize a validity period and access permission.

In this embodiment of this application, the cloud management platform 310 may perform function extension on the STS providing module 313, for example, extend an STS token issuing function API, to enable the STS providing module 313 to return, to the user (for example, an application program in the enclave instance) based on an input attribute specified by the token issuing function API and a conversion rule customized by the first tenant, a token having a tenant-customized attribute, where the token indicates that the application program in the enclave instance has permission to access the target cloud service.

The user may obtain, in any manner, the access credential granted by the first tenant to the user. The user may obtain the attestation document of the enclave instance from a TCB, and request, by using the access credential and the attestation document, to invoke the API provided by the cloud management platform 310, to send a token obtaining request to the STS providing module 313 of the cloud management platform 310, where the token obtaining request carries a request parameter, and the request parameter is used to request to obtain an access token for the API of the target cloud service.

In addition to basic information (for example, a qualification certificate and a digital signature) for issuing the STS token, the request parameter may further include to-be-verified attribute information required by an input attribute customized by the first tenant during security management service configuration, for example, the attestation document that is provided by an enclave instance corresponding to the enclave instance type input or selected by the first tenant and that is of the enclave instance. A verification unit of the STS providing module 313 may first perform validity verification on the request parameter based on a trust relationship between the STS providing module 313 and the security management service providing module 311 and the IAM service providing module 312, including but not limited to verifying the identity or permission of the user, verifying whether the request parameter includes the specified input attribute, and verifying validity of the input attribute (including verifying the digital signature and expiration time of the input attribute). If the verification fails, the cloud management platform 310 returns an error prompt to the user node. If the verification succeeds, the verification is passed.

After the validity verification is passed, the attribute conversion unit of the STS providing module 313 may perform condition judgment on the input attribute set in the request parameter according to the conversion rule in the at least one attribute object, and perform attribute conversion after the input attribute set meets the condition specified by the conversion rule, to determine the corresponding output attribute set, namely, the tenant-customized attribute. The generation unit of the STS providing module 313 may generate, based on the output attribute set, a target access token, namely, a token carrying the tenant-customized attribute. The cloud management platform 310 may send the token to the application program in the enclave instance.

The application program in the enclave instance may send, by using the obtained target access token, a service invocation request to the target cloud service provided by the cloud service module 320. After receiving the service invocation request, the target cloud service in the cloud service module 320 confirms validity of the token with the STS, and the target cloud service may run the application program to access the target cloud service on a premise that the STS confirms that the token is valid.

In an optional implementation, the target cloud service may send the target access token from the application program to the cloud management platform 310 via an internal network. The STS providing module 313 of the cloud management platform 310 may perform validity verification on the target access token, for example, determine whether the target access token is issued by the STS providing module 313 and whether an attribute set associated with the target access token is the output attribute set obtained through conversion by using the conversion rule of the security management service providing module 311. The IAM service providing module 312 may perform an access control check on the target access token, for example, check whether the attribute set associated with the target access token meets permission granted to the application program by the authorization policy. In another optional implementation, the target cloud service may obtain, from a related service providing module based on a trust relationship with each service providing module of the cloud management platform 310, information (including but not limited to a verification key or a certificate of the STS token generated by the STS providing module 313) for performing validity verification and access control check, and use the obtained information to perform validity verification and access control check on the target access token from the application program locally in the cloud service module 320. This implementation is not limited in this embodiment of this application.

It should be noted that, in actual application, if the security management service providing module 311 is a submodule of a service providing module (for example, the STS providing module 313) of the cloud management platform 310, correspondingly, function extension may be performed on the STS providing module 313, or a functional component of the STS providing module 313 may be extended, to enable the STS providing module 313 obtained after the function extension to implement a function implemented by the security management service providing module 311. For details, refer to related descriptions of the security management service providing module 311. Details are not described herein again.

So far, the cloud service system 300 and the functional modules of the cloud service system 300 in this embodiment of this application have been described with reference to the accompanying drawings and embodiments. The cloud management platform 310 may provide a customized channel that is of the security management service information and that is expected by the tenant, to enable the tenant to customize configuration of the security management service information. For a tenant who sets the security management service information through the API, the cloud management platform 310 performs function extension on other associated services such as an IAM service and an STS service based on the security management service configuration information customized by the tenant, so that the cloud management platform 310 can centrally and securely implement, based on the security management service configuration information customized by the tenant, access control management on the cloud resource purchased by the tenant. In this solution, upgrade and reconstruction of the function of the cloud management platform 310 and the cloud service module can be decoupled, so that the cloud service module does not need to be reconstructed, and the service providing solution in this embodiment of this application can be supported with a low reconstruction cost. The tenant (for example, the security administrator or the permission administrator) does not need to perceive an underlying semantic feature semantic meaning of a hardware or software running environment of the application program in the enclave instance, and a difference between hardware features corresponding to different application programs. Therefore, it is easier to write the authorization policy, and policy writing and management costs are greatly reduced. In addition, the solution enables the application program to directly use the STS token within the validity period of the STS token. This can greatly reduce performance overheads of a device in which the application program is located.

It should be noted that, in the foregoing embodiment of this application, the IAM service and the STS service provided by the cloud management platform are merely used as an example to describe a permission management function implemented based on the security management service customized and configured by the tenant, but not any limitation. In another embodiment, the cloud management platform may further provide another service for the tenant and the user. The another service may also be implemented with reference to the security management service customized and configured by the tenant, to centrally and securely implement permission management on the cloud resource purchased by the tenant. For similar implementation, refer to the foregoing related descriptions with reference to the security management service providing module 311. Details are not described herein again.

It should be noted that, in this embodiment of this application, carrying the attribute information in the request parameter transferred by the application program to the cloud management platform is merely an example for describing the implementation of the service providing method in this embodiment of this application, but not any limitation. In another example, the request parameter may not include the to-be-verified attribute information required by the input attribute customized by the tenant during security management service configuration. For example, based on an application scenario or a service requirement, the cloud management platform may store, in a memory associated with the cloud management platform (or accessible), the to-be-verified attribute information required by the input attribute customized by the tenant during security management service configuration. The request parameter from the user may include identity information of the user and basic information (for example, the qualification certificate and the digital signature) for issuing the STS token. The STS providing module of the cloud management platform may perform condition judgment by using locally stored (or available) attribute information associated with the user as the input attribute set associated with the request parameter after verification on the identity and permission of the user is passed, and perform attribute conversion after the input attribute set meets the condition specified by the attribute conversion rule, to determine the corresponding output attribute set, so that the generation unit of the STS providing module can generate the target access token based on the output attribute set. For example, the attribute information associated with the user may include but is not limited to, for example, attribute information obtained based on the identity of the user, a network IP, and the like. This is not limited in this application.

The following describes a cloud service access permission setting method for an enclave instance in embodiments of this application with reference to the accompanying drawings and embodiments.

Figure 4:
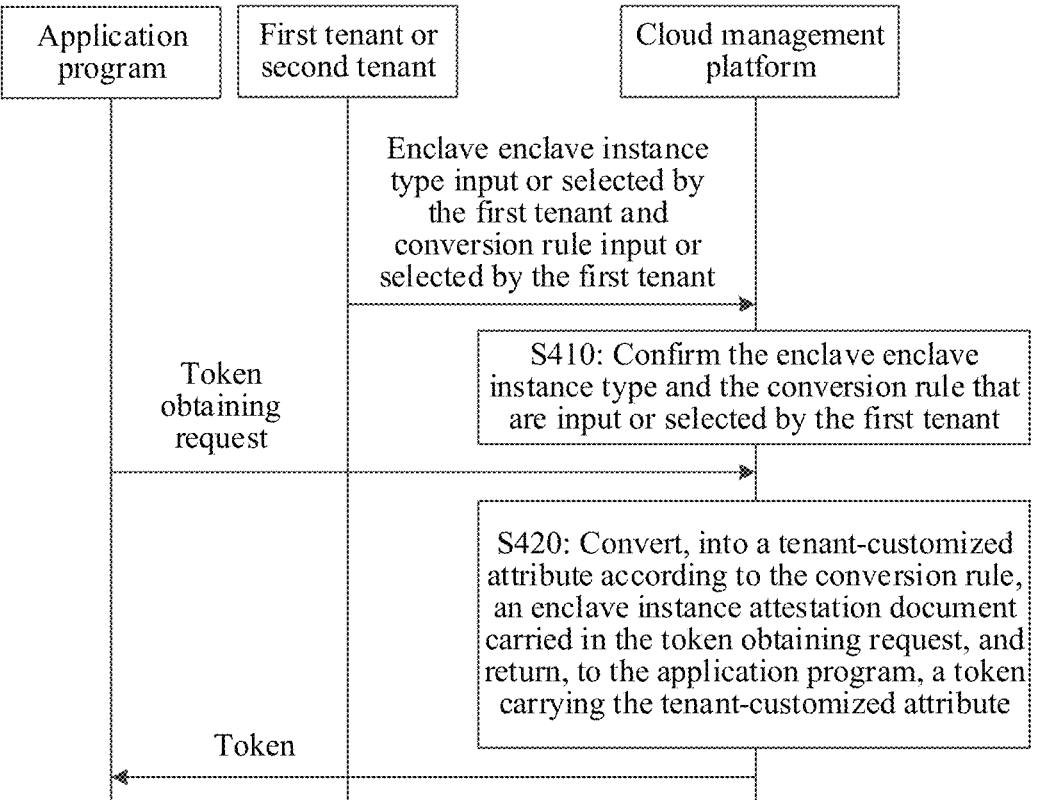
FIG. 4 is a schematic flowchart of a cloud service access permission setting method according to an embodiment of this application.

FIG. 4 is a schematic flowchart of a cloud service access permission setting method for an enclave instance according to an embodiment of this application. The method may be implemented by a first tenant, a second tenant, an application program in the enclave instance, and the cloud management platform and the functional module of the cloud management platform shown in FIG. 3. As shown in FIG. 4, the method may include the following steps.

S410: An IAM service of the cloud management platform confirms an enclave instance type input or selected by the first tenant and a conversion rule input or selected by the first tenant.

In this embodiment of this application, the enclave instance type and the conversion rule may be obtained through customized configuration by the first tenant. The conversion rule is used to convert, into a tenant-customized attribute, an enclave instance attestation document provided by an enclave instance corresponding to the enclave instance type, to help the cloud management platform implement centralized and secure access control management on a cloud resource purchased by the first tenant.

In an optional implementation, the enclave instance type and the conversion rule may be obtained through pre-customized configuration by the tenant and persistently stored in a memory associated with a security management service providing module of the cloud management platform. When S410 is implemented, an IAM service providing module of the cloud management platform may confirm, in the memory, the enclave instance type and the conversion rule. For example, the IAM service providing module may obtain security management service configuration information of the tenant from the memory based on a unique identifier of the first tenant.

In another optional implementation, the enclave instance type and the conversion rule may be configured by the first tenant in real time. When S410 is implemented, the IAM service providing module of the cloud management platform may receive, in real time, the enclave instance type input or selected by the first tenant and the conversion rule input or selected by the first tenant. A manner of confirming the instance type and the conversion rule is not limited in this embodiment of this application. For configuration details, refer to related descriptions of the API and the console interface described above with reference to FIG. 3. Details are not described herein again.

S420: An STS of the cloud management platform receives a token obtaining request sent by an application program in the enclave instance, converts, into the tenant-customized attribute according to the conversion rule, the enclave instance attestation document carried in the token obtaining request, and returns, to the application program, a token carrying the tenant-customized attribute, where the token indicates that the application program in the enclave instance has permission to access a target cloud service.

In this embodiment of this application, an STS providing module of the cloud management platform may provide an API for the application program in the enclave instance. After obtaining a correct access credential (for example, an access key), the application program may send the token obtaining request to the STS providing module based on a security management service provided by the cloud management platform and the API provided by the STS providing module, to transfer a request parameter to the STS, where the request parameter is used to request to obtain an access token of the API of the target cloud service subscribed by a tenant node.

For example, the request parameter may include but is not limited to input parameters such as the enclave instance attestation document, an identity of an API requester, and a digital signature of an API request body.

A function of issuing the access token may be provided by the STS providing module. After function extension, the STS providing module may include a verification unit, an attribute conversion unit, and a generation unit. When S420 is implemented, the verification unit may first perform validity verification on the request parameter based on metadata in at least one attribute object, for example, verifying an identity of a requester, a digital signature of a request body, and validity of a security attribute attestation document (where for example, whether a specified attribute is included, whether a digital signature of an attribute attestation document is valid, and whether an expiry time is valid). If the verification is not passed, in other words, the verification fails, an error prompt is returned to the application program. If the verification is passed, in other words, the verification succeeds, related attribute information of the attestation document carried in the request parameter may be used as an input attribute set of the attribute conversion unit. The attribute conversion unit may convert, by using the conversion rule in the at least one attribute object, the attestation document into the tenant-customized attribute, namely, an output attribute set. If the conversion fails, an error prompt is returned to the application program. If the conversion succeeds, the generation unit may generate a target access token based on the output attribute set and a preset algorithm, where the target access token is the token carrying the tenant-customized attribute. Further, the STS providing module may send the target access token to the application program.

In an optional implementation, the cloud management platform may further provide an IAM service. The cloud management platform may further obtain an authorization policy input or selected by the first tenant or the second tenant on the cloud management platform. The authorization policy indicates an access control condition that should be met when the first tenant or the second tenant authorizes the application program to access the target cloud service. In the foregoing process of implementing S420, the STS providing module of the cloud management platform may perform validity verification and access control check on the request parameter according to the authorization policy. If the validity verification fails or the access control check fails, the STS providing module may return an error prompt to the application program and deny the token obtaining request of the application program. For implementation details, refer to related descriptions described above with reference to FIG. 3. Details are not described herein again.

After S420, an optional step includes: The application program may initiate a service invocation request to a cloud service module based on the target access token obtained from the cloud management platform, where the service invocation request may be used to request to access the target cloud service of the cloud service module. The target cloud service may perform validity verification and access control check on the target access token locally or by using a trust relationship with the STS providing module, the IAM service providing module, and the like. After the verification and the access control check are passed, the cloud service module provides the target cloud service for the application program. For implementation details, refer to related descriptions described above with reference to FIG. 3. Details are not described herein again.

Figure 5:
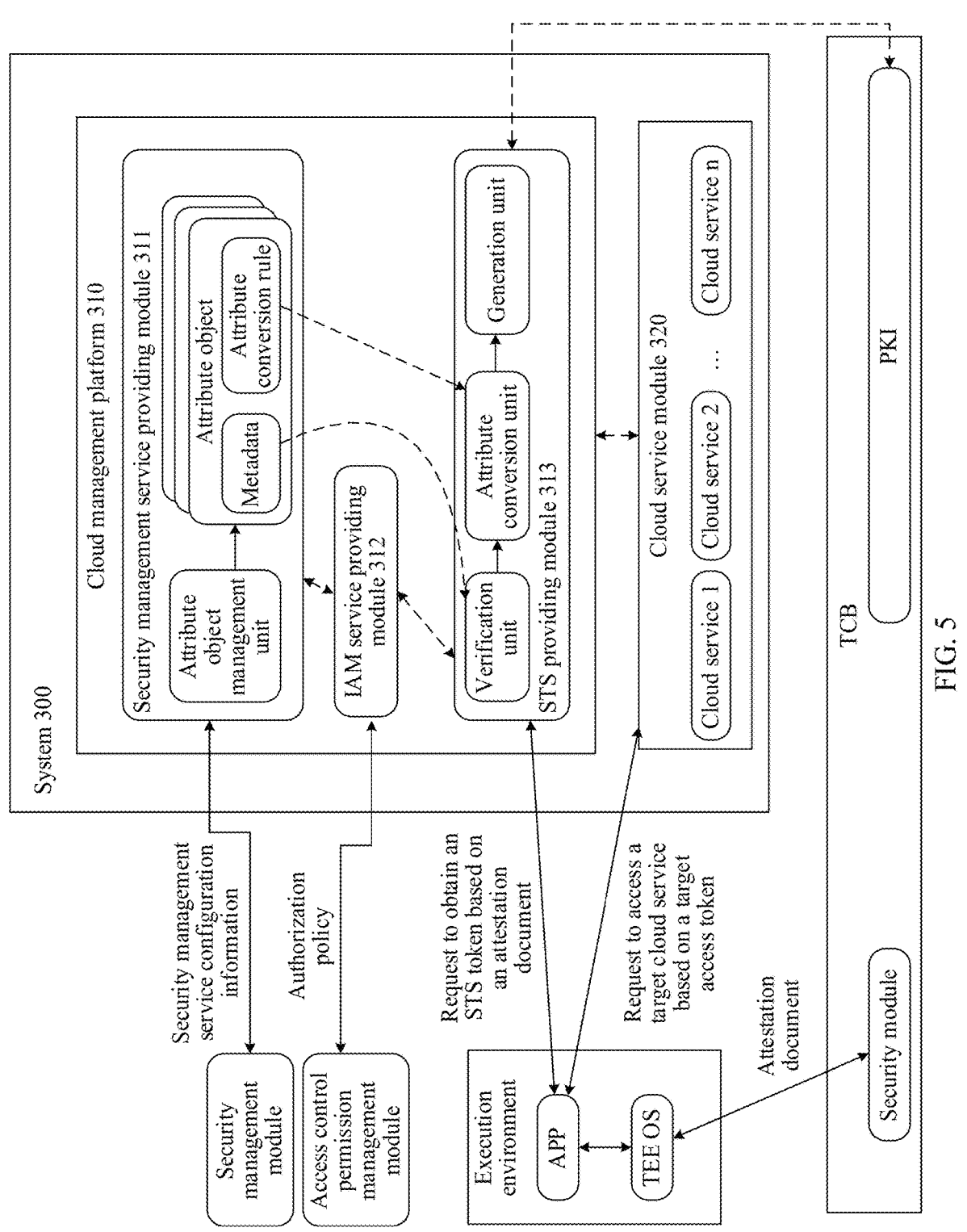
FIG. 5 is a schematic flowchart of a cloud service access permission setting method according to an embodiment of this application.

Based on the system architecture shown in FIG. 3, the following describes in detail the method steps shown in FIG. 4 with reference to a method shown in FIG. 5.

As shown in FIG. 5, the first tenant or the second tenant may be implemented as a management module corresponding to a service providing module of the cloud management platform, for example, a security management module and an access control permission management module.

The security management module may send the security management service configuration information to the security management service providing module of the cloud management platform based on the API provided by the cloud management platform. The security management service configuration information may be received and stored by the security management service providing module, and is used to verify validity of a request parameter from an APP and implement secure access control management on the cloud resource purchased by the tenant.

The access control permission management module may send the authorization policy to the IAM service providing module of the cloud management platform based on the API provided by the cloud management platform. The authorization policy may be received and stored by the IAM service providing module, and is used to verify operation permission of the APP on a cloud service purchased by the tenant and determine an access control policy of the APP.

For example, the at least one attribute object customized and configured by the tenant includes a security attestation object. At least one attribute of the security attestation object includes a security attribute. The security attribute may be used by the cloud management platform to perform verification on an attestation document (attestation document) from the APP, to implement a more accurate access control decision based on a trusted computing environment or a confidential computing environment (for example, enclave) of the APP and centrally and securely manage the cloud resource.

For example, the security attribute may include at least one of the following: a hardware identifier attribute, a secure firmware version attribute, a creation time attribute, a program measurement-related attribute, a digital signature certificate-related attribute, or a service security attribute customized by the tenant. Each security attribute is used to verify validity (or referred to as effectiveness, trustworthiness, or the like) of the attestation document from the APP. The hardware identifier attribute indicates a hardware identifier, and indicates that an attestation document from a user node may be effective only when the attestation document includes the hardware identifier attribute, and the validity verification is not passed when the attestation document does not include the hardware identifier attribute. The secure firmware version attribute indicates a secure firmware version, and indicates that the attestation document from the APP may be effective only when the attestation document includes the secure firmware version, and the validity verification is not passed when the attestation document does not include the secure firmware version. The creation time attribute indicates creation time, and indicates that the attestation document from the APP may be effective only when the attestation document includes the creation time, and the validity verification is not passed when the attestation document does not include the creation time. The program measurement related attribute indicates a measurement-related attribute of an executable program, for example, a trusted measurement algorithm, a trusted measurement value, and the like, and indicates that the attestation document from the user node may be effective only when the attestation document includes trusted measurement-related information, and the validity verification is not passed when the attestation document does not include the trusted measurement-related information. The digital signature certificate-related attribute indicates a digital signature certificate, a certificate chain, and other attributes of the security attribute attestation document, and indicates that the attestation document from the APP may be effective only when the attestation document includes information such as the digital signature certificate and the certificate chain, and the validity verification is not passed when the attestation document does not include the information. The service security attribute customized by the tenant includes any service security attribute customized by the tenant. Details are not described herein again.

The security management service providing module may create a corresponding attribute object based on attribute object description information in the security management service configuration information from the security management module, where the attribute object may include the metadata of the at least one attribute and an attribute conversion rule.

The IAM service providing module may determine, according to the authorization policy from the access control permission management module and by using the trust relationship between the IAM service providing module and the security management service providing module, different access permission granted by the tenant to different users for different cloud resources.

As an initiator, an enclave APP (a client application program executed in the confidential computing environment) on a user side may invoke a security module of a TCB through a TEE operating system (OS) interface, to obtain an attestation document of a security attribute of an enclave confidential computing environment. After the request succeeds, the security module returns an effective attestation document to the enclave APP. The enclave APP may invoke an STS Get Token API based on the attestation document and send the token obtaining request to the STS providing module of the cloud management platform, to transfer the request parameter to the STS providing module. The request parameter includes information such as the enclave instance attestation document, the identity information of the requester, and the digital signature information of the request body, and the request parameter is used to request to obtain the STS token.

The verification unit of the STS providing module of the cloud management platform may perform, according to the authorization policy configured on an IAM service providing module side and the metadata configured on a security management service providing module side, validity verification and permission verification on the request parameter carried in the token obtaining request. After the validity verification and the permission verification of the request parameter are passed, according to the conversion rule related to the enclave attribute of the security management service providing module, the attribute conversion unit of the STS providing module may use a related attribute in the attestation document as the input attribute set and convert the input attribute set into the tenant-customized attribute, namely, the output attribute set. The generation unit may generate, by using the output attribute set, an effective target access token, namely, the token carrying the tenant-customized attribute. Then, the STS providing module may return the effective target access token to the APP.

Further, the APP may send the service invocation request to the target cloud service of the cloud service module by using the target access token obtained from the cloud management platform, to request to access the target cloud service. The target cloud service may perform validity verification and access control check on the target access token from the APP by using a related service provided by the cloud management platform. After the validity verification and access control check are passed, the target cloud service allows the APP to access the target cloud service and returns an access result of the target cloud service to the APP.

In this way, according to the method shown in FIG. 5, after function extension is performed on the at least one service providing module of the cloud management platform, the cloud management platform can support an access control policy that is based on a device running environment attribute of the APP when no reconstruction or upgrade (including API reconstruction or SDK reconstruction) needs to be performed on at least one cloud service of the cloud service module. This is not intrusive to a cloud service API, and is friendly to an application program ecosystem and a developer ecosystem. For the tenant, it is easier for the tenant to write the authorization policy. An underlying semantic feature of the device running environment attribute of the APP does not need to be sensed, features of different types of user equipment can be supported, underlying semantic features of the different types of user equipment can be shielded, and an application scenario can be expanded with extremely low design and implementation costs.

It should be noted that, in FIG. 5, the enclave instance and the enclave instance attestation document are merely used as an example to describe and explain the cloud service access permission setting method in this embodiment of this application, and an attribute object to which the method is oriented is not limited to the enclave instance. The enclave instance may be replaced with another type of instance, and service configuration information or a request parameter related to the enclave instance may be replaced with another attribute. Details are not described herein again.

With reference to the foregoing method embodiments, an embodiment of this application further provides a cloud management platform. For a specific structure of the cloud management platform, refer to FIG. 3. The cloud management platform may be configured to perform the method performed by the cloud management platform and the service providing modules of the cloud management platform in the foregoing method embodiments.

Figure 6:
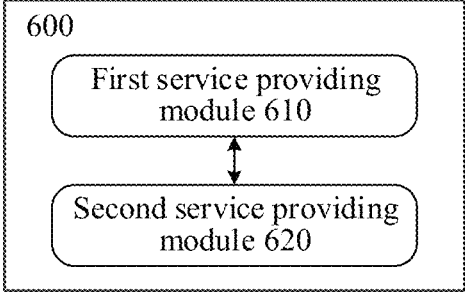
FIG. 6 is a schematic diagram of a structure of a cloud management platform according to an embodiment of this application.

As shown in FIG. 6, the cloud management platform 600 may include: a first service providing module 610, configured to provide an IAM service, where the IAM service is used to confirm an enclave instance type input or selected by a first tenant and a conversion rule input or selected by the first tenant, and the conversion rule is used to convert, into a tenant-customized attribute, an enclave instance attestation document provided by an enclave instance corresponding to the enclave instance type; and a second service providing module 620, configured to provide a STS, where the STS is used to receive a token obtaining request sent by an application program in the enclave instance, the token obtaining request carries the enclave instance attestation document, and the STS is further used to: convert the attestation document into the tenant-customized attribute according to the conversion rule, and return, to the application program, a token carrying the tenant-customized attribute, where the token indicates that the application program in the enclave instance has permission to access a target cloud service. For implementation details, refer to related descriptions of the foregoing method embodiments. Details are not described herein again.

It should be noted that, in this embodiment of this application, division into the units is an example, and is merely logical function division. In actual implementation, another division manner may be used. Functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions may be implemented in a form of a software product. The computer software product is stored in a storage medium, and includes several instructions for instructing a computer device (which may be a personal computer, a server, a network device, or the like) or a processor (processor) to perform all or some of the steps of the methods in embodiments of this application. The storage medium includes any medium that can store program code, such as a Universal Serial Bus (USB) flash drive, a removable hard disk, a read-only memory (ROM), a random-access memory (RAM), a magnetic disk, or an optical disc.

Figure 7:
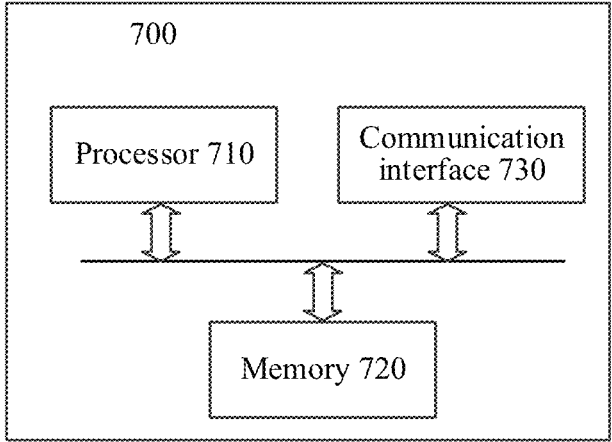
FIG. 7 is a schematic diagram of a structure of a communication apparatus according to an embodiment of this application.

In a simple embodiment, a person skilled in the art may figure out that the cloud management platform or the electronic device in the foregoing embodiments may use a form shown in FIG. 7. A communication apparatus 700 shown in FIG. 7 includes at least one processor 710 and a memory 720. Optionally, the communication apparatus 700 may further include a communication interface 730.

The memory 720 may be a volatile memory, for example, a RAM. Alternatively, the memory may be a non-volatile memory, for example, a ROM, a flash memory, a hard disk drive (HDD), or a solid-state drive (SSD). Alternatively, the memory 720 is any other medium that can carry or store expected program code in a form of an instruction or a data structure and that can be accessed by a computer. However, this is not limited thereto. The memory 720 may be a combination of the foregoing memories.

A specific connection medium between the processor 710 and the memory 720 is not limited in this embodiment of this application.

The apparatus shown in FIG. 7 further includes the communication interface 730. When communicating with another device, the processor 710 may perform data transmission through the communication interface 730.

When the cloud management platform uses the form shown in FIG. 7, the processor 710 in FIG. 7 may invoke computer-executable instructions stored in the memory 720, to enable the apparatus 700 to perform the method performed by the cloud management platform in any one of the foregoing method embodiments.

When an electronic device on a tenant or user side uses the form shown in FIG. 7, the processor 710 in FIG. 7 may invoke computer-executable instructions stored in the memory 720, to enable the apparatus 700 to perform the method performed by the tenant or the user in any one of the foregoing method embodiments.

An embodiment of this application further relates to a chip system. The chip system includes a processor, configured to invoke a computer program or computer instructions stored in a memory, to enable the processor to perform the foregoing method embodiments.

In a possible implementation, the processor is coupled to the memory through an interface.

In a possible implementation, the chip system further includes a memory, and the memory stores a computer program or computer instructions.

An embodiment of this application further relates to a processor. The processor is configured to invoke a computer program or computer instructions stored in a memory, to enable the processor to perform the foregoing method embodiments.

The processor mentioned in any of the foregoing may be a general-purpose central processing unit, a microprocessor, an application-specific integrated circuit (ASIC), or one or more integrated circuits configured to control program execution of the method in the embodiment shown in FIG. 7. The memory mentioned in any of the foregoing may be a ROM, another type of static storage device that can store static information and instructions, a RAM, or the like.

It should be understood that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product implemented on one or more computer-usable storage media (including but not limited to a disk memory, a compact-disk read-only memory (CD-ROM), and an optical memory) that include computer-usable program code.

These computer program instructions may be stored in a computer-readable memory that can indicate the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or another programmable device, to generate computer-implemented processing. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to embodiments of this application without departing from the scope of embodiments of this application. In this case, this application is intended to cover these modifications and variations of embodiments of this application provided that they fall within the scope of protection defined by the following claims of this application and their equivalent technologies.

The invention claimed is:

1. A method comprising:
providing, by a cloud management platform, an identity and access management (IAM) service, wherein the IAM service is configured to confirm an enclave instance type and a conversion rule input or selected by a first tenant, and wherein the conversion rule is configured to convert, into a tenant-customized attribute, an enclave instance attestation document provided by an enclave instance corresponding to the enclave instance type; and
providing, by the cloud management platform, a security token service (STS), wherein the STS is configured to:
receive a token obtaining request from an application program in the enclave instance, wherein the token obtaining request carries the enclave instance attestation document obtained from a trusted computing base (TCB);
convert the enclave instance attestation document into the tenant-customized attribute according to the conversion rule; and
return, to the application program, a token carrying the tenant-customized attribute, wherein the token indicates that the application program in the enclave instance has permission to access a target cloud service.

2. The method according to claim 1, wherein the IAM service is further configured to confirm an authorization policy input or selected by the first tenant or a second tenant, wherein the STS is further configured to further convert the enclave instance attestation document into the tenant-customized attribute according to the conversion rule when the authorization policy is met.

3. The method according to claim 2, wherein the first tenant is a security administrator, and wherein the second tenant is a permission administrator.

4. The method according to claim 2, wherein the authorization policy comprises allowing the application program to access the target cloud service in the enclave instance corresponding to the enclave instance type.

5. The method according to claim 1, further comprising:

sending, by the application program in the enclave instance, a service invocation request to the target cloud service, wherein the service invocation request carries the token;

receiving, by the target cloud service, the service invocation request;

confirming, by the target cloud service, validity of the token with the STS; and allowing, by the target cloud service, the application program to access the target cloud service on a premise that the STS confirms that the token is valid.

6. The method according to claim 1, wherein the enclave instance attestation document comprises at least one platform configuration register (PCR) measurement value.

7. A cloud service system, comprising:

a target cloud service; and a cloud management platform configured to:

provide an identity and access management (IAM) service, wherein the IAM service is configured to confirm an enclave instance type and a conversion rule input or selected by a first tenant, wherein the conversion rule is configured to convert, into a tenant-customized attribute, an enclave instance attestation document provided by an enclave instance corresponding to the enclave instance type, and wherein the enclave instance comprises an application program; and provide a security token service (STS), wherein the STS is configured to receive a token obtaining request from the application program, wherein the token obtaining request carries the enclave instance attestation document obtained from a trusted computing base (TCB), and wherein the STS is further configured to:

convert the enclave instance attestation document into the tenant-customized attribute according to the conversion rule; and return, to the application program, a token carrying the tenant-customized attribute, wherein the token indicates that the application program in the enclave instance has permission to access the target cloud service.

8. The cloud service system according to claim 7, wherein the IAM service is further configured to confirm an authorization policy input or selected by the first tenant or a second tenant, wherein the STS is further configured to further convert the enclave instance attestation document into the tenant-customized attribute according to the conversion rule when the authorization policy is met, and wherein the STS returns, to the application program, the token carrying the tenant-customized attribute.

9. The cloud service system according to claim 8, wherein a role of the first tenant is a security administrator, and wherein the second tenant is a permission administrator.

10. The cloud service system according to claim 8, wherein the authorization policy comprises allowing the application program to access the target cloud service in the enclave instance corresponding to the enclave instance type.

11. The cloud service system according to claim 7, wherein the application program is configured to send a service invocation request to the target cloud service, wherein the service invocation request carries the token, and wherein the target cloud service is configured to:

receive the service invocation request;

confirm validity of the token with the STS; and allow the application program to access the target cloud service on a premise that the STS confirms that the token is valid.

12. The cloud service system according to claim 7, wherein the enclave instance attestation document comprises at least one platform configuration register (PCR) measurement value.

13. A cloud management platform, comprising:

a memory configured to store instructions; and at least one processor coupled to the memory and configured to execute the instructions to cause the cloud management platform to:

provide an identity and access management (IAM) service, wherein the IAM service is configured to confirm an enclave instance type and a conversion rule input or selected by a first tenant, and wherein the conversion rule is configured to convert, into a tenant-customized attribute, an enclave instance attestation document provided by an enclave instance corresponding to the enclave instance type, wherein the enclave instance comprises an application program; and provide a security token service (STS), wherein the STS is configured to receive a token obtaining request from the application program, wherein the token obtaining request carries the enclave instance attestation document obtained from a trusted computing base (TCB), and wherein the STS is further configured to:

convert the enclave instance attestation document into the tenant-customized attribute according to the conversion rule; and return, to the application program, a token carrying the tenant-customized attribute, wherein the token indicates that the application program has permission to access a target cloud service.

14. The cloud management platform according to claim 13, wherein the IAM service is further configured to confirm an authorization policy input or selected by the first tenant or a second tenant, wherein the STS is further configured to further convert the enclave instance attestation document into the tenant-customized attribute according to the conversion rule when the authorization policy is met, and wherein the STS returns, to the application program, the token carrying the tenant-customized attribute.

15. The cloud management platform according to claim 14, wherein the first tenant is a security administrator, and wherein the second tenant is a permission administrator.

16. The cloud management platform according to claim 14, wherein the authorization policy comprises allowing the application program to access the target cloud service in the enclave instance corresponding to the enclave instance type.

17. The cloud management platform according to claim 13, wherein the at least one processor is further configured to execute the instructions to cause the cloud management platform to:

send, by the application program, a service invocation request to the target cloud service, wherein the service invocation request carries the token; and receive, by the target cloud service, the service invocation request, wherein the service invocation request confirms validity of the token with the STS and allows the application program to access the target cloud service on a premise that the STS confirms that the token is valid.

\* \* \* \* \*